United States Patent
Mildh et al.

(10) Patent No.: US 10,264,460 B2
(45) Date of Patent: Apr. 16, 2019

(54) RAN SIGNALED BITMAP SPLITTING FOR ROAMING AND NON-ROAMING USERS

(71) Applicant: Telefonaktiebolaget LM Ericsson (publ), Stockholm (SE)

(72) Inventors: Gunnar Mildh, Sollentuna (SE); Mattias Tan Bergström, Stockholm (SE); Stefan Rommer, Västra Frölunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 48 days.

(21) Appl. No.: 15/300,157

(22) PCT Filed: Mar. 30, 2015

(86) PCT No.: PCT/SE2015/050384
§ 371 (c)(1),
(2) Date: Sep. 28, 2016

(87) PCT Pub. No.: WO2015/152805
PCT Pub. Date: Oct. 8, 2015

(65) Prior Publication Data
US 2017/0180997 A1    Jun. 22, 2017

Related U.S. Application Data

(60) Provisional application No. 61/972,828, filed on Mar. 31, 2014.

(51) Int. Cl.
*H04W 16/10* (2009.01)
*H04W 28/08* (2009.01)
(Continued)

(52) U.S. Cl.
CPC ............ *H04W 16/10* (2013.01); *H04L 1/1614* (2013.01); *H04W 4/025* (2013.01); *H04W 8/20* (2013.01);
(Continued)

(58) Field of Classification Search
CPC ....... H04W 16/10; H04W 4/025; H04W 8/20; H04L 1/1614
See application file for complete search history.

(56) References Cited

FOREIGN PATENT DOCUMENTS

| WO | 2014013085 A2 | 1/2014 |
|---|---|---|
| WO | 2015148507 A1 | 10/2015 |
| WO | 2015170823 A1 | 11/2015 |

OTHER PUBLICATIONS

Unknown author, "Use of OPI in ANDSF", SA WG2 Meeting #103, S2-141830, At&T, Phoneix, USA, May 23-29, 2014, 1-5.*
(Continued)

*Primary Examiner* — Siming Liu
(74) *Attorney, Agent, or Firm* — Sage Patent Group (57) ABSTRACT

The disclosure relates to a method (20) performed in a communication device (2). The method (20) comprises obtaining (21) a policy comprising one or more rules associated with different values of a parameter, the parameter comprising a first part and a second part; receiving (22) the parameter; and applying (24, 26) a rule associated with a value of the first part of the parameter or a rule associated with a value of the second part of the parameter. The disclosure also relates to a corresponding method in a communication system (1), to a communication device (2), a communication system (1), computer programs and computer program products.

9 Claims, 4 Drawing Sheets

(51) Int. Cl.
  *H04L 1/16*    (2006.01)
  *H04W 4/02*    (2018.01)
  *H04W 8/20*    (2009.01)
  *H04W 36/22*   (2009.01)
  *H04W 8/18*    (2009.01)
  *H04W 48/08*   (2009.01)
  *H04W 48/18*   (2009.01)

(52) U.S. Cl.
  CPC .............. *H04W 28/08* (2013.01); *H04W 8/18* (2013.01); *H04W 36/22* (2013.01); *H04W 48/08* (2013.01); *H04W 48/18* (2013.01)

(56) References Cited

OTHER PUBLICATIONS

S2-140951; Policy based on OPI; 3GPP Draft 20140323; 3rd Generation Partnership Project (3GPP), Mobile Competence Centre; 650, route des Lucioles; F-06921 Sophia-Antipolis Cedex; France; Mar. 2014 URL: http://www.3gpp.org/ftp/Meetings_3GPP_SYNC/SA2/Docs/.*

S2-141202, OPI evaluation and use in ANDSF policies; 3GPP Draft; 20140323; 3rd Generation Partnership Project (3GPP), Mobile Competence Centre; 650, route des Lucioles; F-06921 Sophia-Antipolis Cedex; France: Mar. 2014 URL: http://www.3gpp.org/ftp/Meetings_3GPP_Sync/SA2/Docs/.*

Unknown Author, "3GPP/WLAN interworking based on ANDSF with RAN assistance", SA WG2 Meeting #102, S2-141005 (revision of S2-14xxxx), Malta, Mar. 24-28, 2014, 1-5.

Unknown Author, "Analysis and Way Forward of the Approaches of OPI", SA WG2 Meeting #102, S2-140994 (revision of S2-14xxxx), St. Julian's, Malta, Mar. 24-28, 2014, 1-3.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 1-356.

3GPP, "3rd Generation Partnership Project; Technical Specification Group Radio Access Network; Radio Resource Control (RRC); Protocol specification (Release 12)", 3GPP TS 25.331 V12.1.0, Mar. 2014, 1-2120.

3GPP,"3rd Generation Partnership Project; Technical Specification Group Services and System Aspects; Architecture enhancements for non-3GPP accesses (Release 12)", 3GPP TS 23.402 V12.4.0, Mar. 2014, 1-288.

3GPP, "3rd Generation Partnership Project; Technical Specification Group Services and System Aspects; Policy and charging control architecture (Release 12) The present", 3GPP TS 23.203 V12.4.0, Mar. 2014, 1-218.

Unknown, Author, "OPI evaluation and use in ANDSF policies", SA WG2 Meeting #102, S2-141202, AT&T, St. Julian's, Malta, Mar. 24-28, 2014, 1-3.

Unknown, Author, "Policy based on OPI", SA WG2 Meeting #102, S2-140951, Ericsson, St. Julian's, Malta, Mar. 24-28, 2014, 1-3.

Unknown, Author, "Use of OPI in ANDSF", SA WG2 Meeting #103, S2-141830, AT&T, Phoenix, USA, May 23-29, 2014, 1-5.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.0.0 (Dec. 2013), Dec. 2013, 1-208.

Rigney, C. et al., "Remote Authentication Dial in User Service (RADIUS)", Network Working Group Request for Comments: 2865 Obsoletes: 2138 Category: Standards Track, Jun. 2000, 1-77.

* cited by examiner

RAN SIGNALED BITMAP SPLITTING FOR ROAMING AND NON-ROAMING USERS

BACKGROUND

Figure 1:
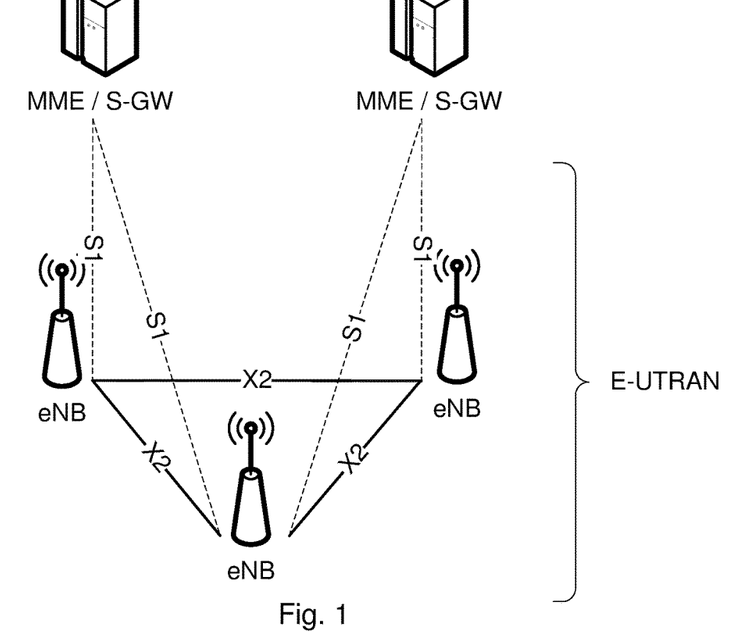
FIG. 1 illustrates an LTE system architecture.

The work of specifying the Evolved UMTS Terrestrial Radio Access Network (E-UTRAN) consisting of the Long Term Evolution (LTE) and System Architecture Evolution (SAE) concepts is currently ongoing within the 3$^{rd}$ Generation Partnership Project (3GPP). The architecture of the LTE system is shown in FIG. 1.

The E-UTRAN consists of base stations called enhanced NodeBs (eNBs or eNodeBs), providing the E-UTRA user plane and control plane protocol terminations towards the User Equipment (UE). The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface. The S1 interface supports many-to-many relation between MMEs/S-GWs and eNBs.

Figure 2:
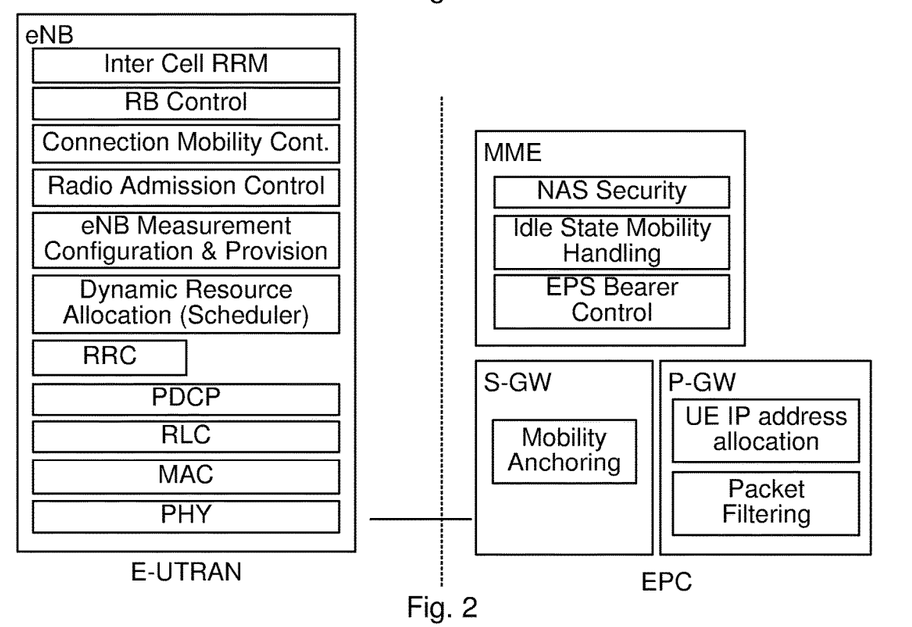
FIG. 2 summarizes functionalities of different nodes of an LTE system.

The eNB hosts functionalities such as Radio Resource Management (RRM), radio bearer control, admission control, header compression of user plane data towards serving gateway, routing of user plane data towards the serving gateway. The MME is the control node that processes the signaling between the UE and the core network (CN). The main functions of the MME are related to connection management and bearer management, which are handled via Non Access Stratum (NAS) protocols. The S-GW is the anchor point for UE mobility, and also includes other functionalities such as temporary downlink (DL) data buffering while the UE is being paged, packet routing and forwarding the right eNB, gathering of information for charging and lawful interception. The packet data network (PDN) Gateway (P-GW) is the node responsible for UE IP address allocation, as well as Quality of Service (QoS) enforcement (this is explained further below). FIG. 2 gives a summary of the functionalities of the different nodes, and 3GPP TS 36.300 is referred to and the references therein show the details of the functionalities of the different nodes. FIG. 2 shows logical nodes, functional entities of the control plane and radio protocol layers.

Using Wireless Fidelity/Wireless Local Area Network (WiFi/WLAN) (the two terms are used interchangeably throughout this document) to offload traffic from the mobile networks is becoming more and more interesting from both the operators' and end users' points of view.

The Access Network Discovery and Selection Function (ANDSF) is an entity defined by 3GPP for providing access discovery information as well as mobility and routing policies to the UE. ANDSF is a new entity added to the 3GPP architecture in Release 8 of 3GPP TS 23.402. By supplying information about available both 3GPP and non-3GPP access networks to the UE, the ANDSF enables an energy-efficient mechanism of network discovery, where the UE can avoid continuous and energy-consuming background scanning. Furthermore, the ANDSF provides the mobile operators with a tool for the implementation of flexible and efficient UE steering of access mechanisms, where policy control can guide UEs to select one particular radio access network (RAN) over another.

It is currently being discussed in 3GPP whether to introduce a parameter signaled from the 3GPP RAN to be used in an ANDSF policy. One example of such a parameter is called "Offloading Preference Indicator (OPI)".

SUMMARY

It is an object of embodiments herein to enable signaling of one or more parameters to roaming and/or non-roaming communication devices in a wireless communication network.

According to a first aspect of embodiments herein, the object is achieved by a method in a radio network node for signaling one or more parameter, such as an offloading preference indicator to at least one communication device, such as a user equipment or UE. The radio network node instructs the communication device regarding which part(s)/bit(s) of the signaled parameter to use depending on whether the communication device is roaming (in a roaming state) or not (non-roaming). According to a second aspect of embodiments herein, the object is achieved by a method in a communication device, such as a user equipment, for receiving, recognizing and responding to one or more signaled parameters. For example, the communication device receives instructions from a radio network node on which part(s)/bit(s) of the signaled parameter to use depending on whether the communication device is roaming (in a roaming state) or not (non-roaming). The communication device then reads the indicated part(s) of the one or more signaled parameter and optionally off-loads to a different radio access network than the radio access network it is currently using or connected to.

According to a third aspect of embodiments herein, the object is achieved by a radio network node adapted to signal one or more parameter, such as an offloading preference indicator to at least one communication device, such as a user equipment. The radio network node includes radio circuitry adapted to send instructions to the communication device on a downlink channel on which part(s)/bit(s) of the signaled parameter to use depending on whether the communication device is roaming (in a roaming state) or not (non-roaming).

According to a fourth aspect of embodiments herein, the object is achieved by a communication device adapted to receive, recognize and respond to one or more signaled parameters. The communication device includes radio circuitry adapted to receive instructions from a radio network node on which part(s)/bit(s) of the signaled parameter to use depending on whether the communication device is roaming (in a roaming state) or not (non-roaming). The communication device further includes a processing unit adapted to read the indicated part(s)/bit(s) of the one or more signaled parameter and, optionally off-load to a different radio access network than the radio access network it is currently using/connected to.

According to some embodiments, the signaled parameter is an off-loading preference indicator.

Thanks to the provision of an offloading preference indicator (OPI) that is split into different regions where different regions are used by different categories of communication devices (roaming or non-roaming), it is possible to achieve the flexibility of an operator-specific OPI, while still supporting roaming usage of the OPI with only limited or no network exposure.

In an aspect, a method is provided performed in a communication device. The method comprises obtaining a policy comprising one or more rules associated with different values of a parameter, the parameter comprising a first part and a second part, receiving the parameter, and applying a rule associated with a value of the first part of the parameter or a rule associated with a value of the second part of the parameter.

In an aspect, a computer program for a communication device is provided. The computer program comprises computer program code, which, when executed on at least one processor on the communication device causes the communication device to perform the method as above.

In an aspect, a computer program product is provided comprising a computer program as above and a computer readable means on which the computer program is stored.

In an aspect, a communication device is provided. The communication devices is configured to obtain a policy comprising one or more rules associated with different values of a parameter, the parameter comprising a first part and a second part; receive the parameter; and apply a rule associated with a value of the first part of the parameter or a rule associated with a value of the second part of the parameter.

In an aspect, a method performed in a communication system is provided. The method comprises sending, to at least one communication device, a policy comprising one or more rules associated with different values of a parameter, the parameter comprising a first part and a second part.

In an aspect, a computer program for a communication system is provided. The computer program comprises computer program code, which, when executed on at least one processor on the communication system causes the communication system to perform the method as above.

In an aspect, a computer program product is provided. The computer program product comprises a computer program as above and a computer readable means on which the computer program is stored.

In an aspect, a communication system is provided. The communication system is configured to send, to at least one communication device, a policy comprising one or more rules associated with different values of a parameter, the parameter comprising a first part and a second part.

DETAILED DESCRIPTION

Communication devices such as wireless devices are also known as e.g., user equipments (UEs), mobile terminals, wireless terminals, and/or mobile stations. Wireless devices are enabled to communicate wirelessly in a cellular communications network or wireless communication system, sometimes also referred to as a cellular radio systems or cellular networks. The communication may be performed, e.g., between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, tablet computers or surf plates with wireless capability, just to mention some further non-limiting examples. Wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The cellular communications network covers a geographical area which is divided into cellular areas, wherein each cell area is served by a radio network node. A cell is the geographical area where radio coverage is provided by the radio network node using a particular carrier frequency or frequencies, or otherwise using a particular allocation of air interface resources. In that regard, two cells using different carriers or resource allocations can fully or partially overlap.

The radio network node may e.g. be a base station such as a Radio Base Station (RBS), eNB, eNodeB, NodeB, B node, or Base Transceiver Station (BTS), depending on the technology and terminology used. The base stations may be of different classes such as e.g. macro eNodeB, home eNodeB or pico base station, based on transmission power and thereby also cell size.

Further, each radio network node may support one or several communication technologies. The radio network nodes communicate over the air interface operating on radio frequencies with the communication devices within range of the radio network node. In the context of this disclosure, the expression Downlink (DL) is used for the transmission path from the base station to the mobile station. The expression Uplink (UL) is used for the transmission path in the opposite direction i.e. from the mobile station to the base station.

A network is said to be a home network for a UE that has a subscription in this network. Correspondingly, a home operator is the operator running the home network. The UE may roam between different networks and be served by another network than the home network. Such other network is denoted visited network and is not run by the home operator. The home operator may have a roaming agreement with the operator of the visited network.

Traffic Offloading Using WiFi

Using WiFi/WLAN (the two terms are used interchangeably throughout this document) to offload traffic from the mobile networks is becoming more and more interesting from both the operators' and the end users' points of view. Some of the reasons for this tendency are:

Additional frequency: by using WiFi, operators can get an additional 85 MHz in the 2.4 GHz band and another (close to) 500 MHz in the 5 GHz band.

Cost: From an operator's point of view, Wi-Fi uses unlicensed frequency that is free of charge. On top of that, the cost of Wi-Fi APs (Access Points), both from capital expenditure (CAPEX) and operational expenditure (OPEX) (deployment) aspects, is considerably lower than that of a 3GPP base station (BS/eNB). Operators can also take advantage of APs already deployed, e.g. in hotspots such as train stations, airports, stadiums, shopping malls, etc. Most end users are also currently used to having Wi-Fi for free at home (as home broadband subscriptions are usually flat rate) and public places.

Terminal support: Almost all User Equipments (UEs) such as smartphones and other portable devices currently available in the market support Wi-Fi. In the WiFi world, the term Station (STA) is used instead of UE, and as such the terms UE, STA, terminal, user, communication device, user node, etc., are used interchangeably in this document; similarly, the term "user" and "users" may be used to denote communication devices operating in or associated with a communication network.

High data rate: Under low interference conditions and assuming the user is close to the Wi-Fi AP, Wi-Fi can provide peak data rates that outshine that of current mobile networks (for example, theoretically up to 600 Mbps for IEEE 802.11n deployments with MIMO (Multiple Input Multiple Output)).

Figure 3:
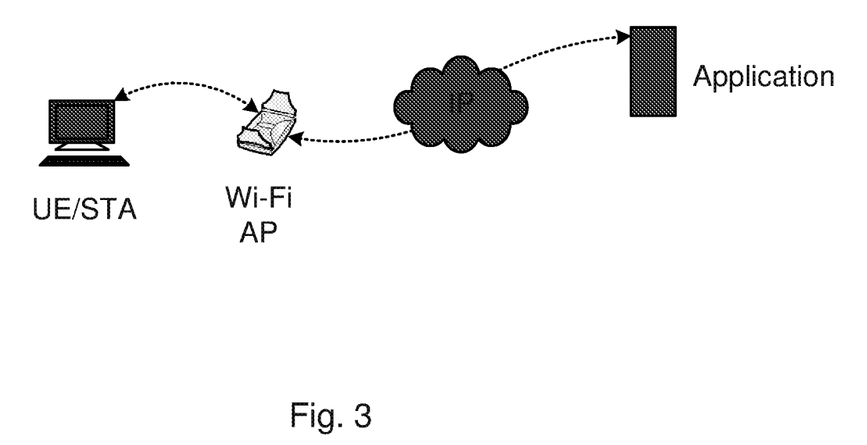
FIG. 3 illustrates a simplified Wi-Fi user plane architecture.
Figure 4:
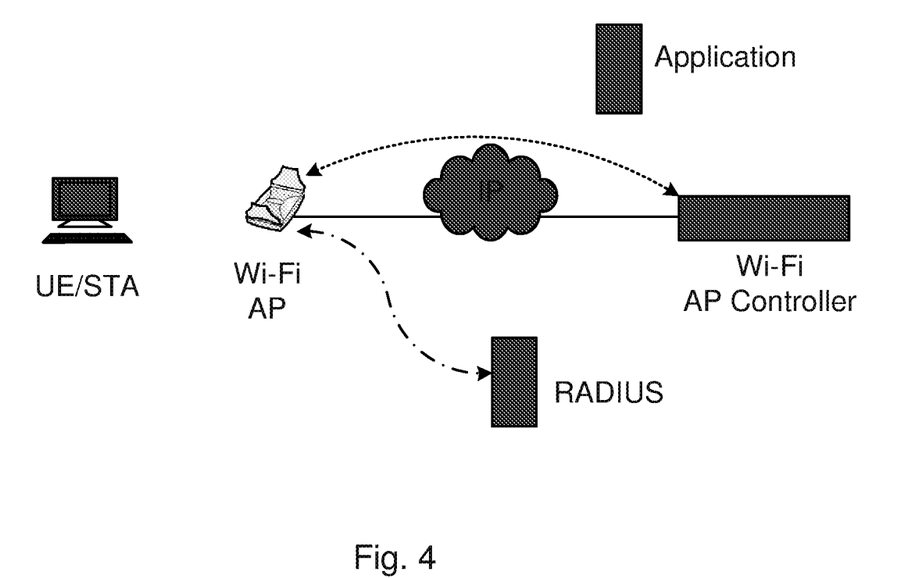
FIG. 4 illustrates a simplified Wi-Fi control plane architecture.

A very simplified Wi-Fi architecture is illustrated in FIG. 3 and FIG. 4. On the user plane (FIG. 3), a very lean architecture is employed where the UE/STA is connected to the Wi-Fi Access Point (AP), which can directly be connected to the Internet. In the control plane (FIG. 4), an Access point Controller (AC) handles the management of the AP. One AC usually handles the management of several APs. Security/authentication of users is handled via an Authentication, Authorization and Accounting (AAA) entity (not illustrated). Remote Administration Dial User Service (RADIUS) is the most widely used network protocol for providing a centralized AAA management (RFC 2865).

Access Network Discovery and Selection Function

Figure 5:
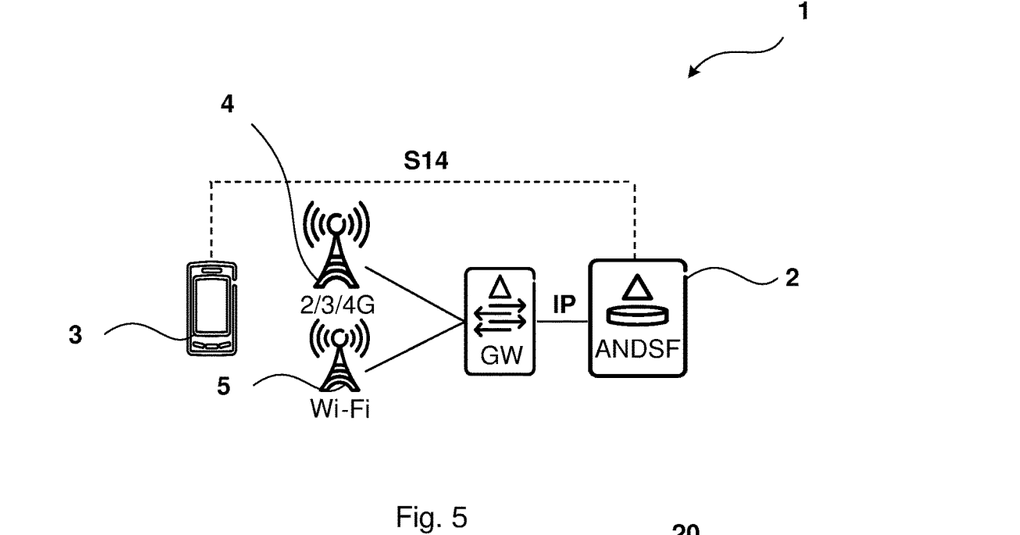
FIG. 5 illustrates a simplified ANDSF architecture.

The Access Network Discovery and Selection Function (ANDSF) is an entity defined by 3GPP for providing access discovery information as well as mobility and routing policies to the UE. ANDSF is a new entity added to the 3GPP architecture in Release 8 of 3GPP TS 23.402. A simplified ANDSF architecture is depicted in FIG. 5. As shown in the figure, an ANDSF server 2 is connected to the UE 3 and its main goal is to provide the UE 3 with access network information, i.e. information about particular access networks, in a resource efficient and secure manner. The communication between the UE 3 and the ANDSF server 2 is defined as an IP-based S14-interface.

A communication network 1 may comprise the ANDSF server 2 and one or more RANs, each RAN in turn comprising one or more network nodes. In the FIG. 5, a first RAN is indicated by a first network node 4. The first RAN may be a cellular mobile network such as a RAN using 2G, 3G or 4G technology. A second RAN is indicated by a second network node 5 that is exemplified by a Wi-Fi RAN.

By supplying information about available 3GPP access networks as well as non-3GPP access networks to the UE, the ANDSF enables an energy-efficient mechanism of network discovery, where the UE can avoid continuous and energy-consuming background scanning. Furthermore, the ANDSF provides the mobile operators with a tool for the implementation of flexible and efficient UE steering of access mechanisms, where policy control can guide UEs to select one particular RAN over another. Note that this may be an overstatement if ANDSF is implemented as an application software, an "app", since it relies on OS support and priority of ANDSF in relation to other "apps". This condition may be only partly fulfilled, which makes the control somewhat unreliable. For instance, an ANDSF client in the UE 3 may be implemented as an app (i.e. software in the UE, also denoted mobile app) and this app could be trying to steer the UE 3 towards using e.g. Wi-Fi, while at the same time Wi-Fi has been turned off by the user of the UE 3. The policy control will then fail.

The ANDSF supplies three types of information—discovery information, inter-system mobility policies (ISMP) and inter-system routing policies (ISRP). All these are summarized and implemented via ANDSF managed objects (MO), which are communicated to the UEs via an over-the-top (OTT) signaling channel, as Simple Object Access Protocol-extensible Markup Language (SOAP-XML) messages.

The discovery information provides the UE 3 with information regarding the availability of different RATs in the UE's 3 vicinity. This helps the UE 3 to discover available (3GPP and) non-3GPP access networks without the burden of continuous background scanning.

The Inter-System Mobility Policies, ISMP, are policies which guide the UE 3 to select the most preferable 3GPP or non-3GPP access. The ISMP are used for UEs that access a single access (3GPP or Wi-Fi) at a time. The ISMP information specifies the behavior of UEs, which can be connected to only one access network at a given time (either 3GPP, WLAN, WiMAX, etc.). If the UE 3, however, supports connection to several access networks at the same time, the operator can use the third type of information Inter-System Routing Policies, ISRP, to increase the granularity of the RAN selection. In that case, the UEs will be provided with policies, which specify how the traffic flows (voice, video streaming etc,) should be distributed over the different RAN. For example, voice is only allowed to be carried over 3GPP RA, while Internet video streaming and best-effort traffic can be routed via WLAN. The ANDSF provides mobile operators with a tool to determine how the UEs connect to different RANs and hence allows them to add more flexibility in their traffic planning. Simplified examples of ANDSF rules are given in Table 1 and Table 2.

TABLE 1

ANDSF MO - Discovery Information

| AccessNetworkType | AccessNetworkArea | AccessNetworkInfoRef |
|---|---|---|
| 3 (WLAN) | Geo Location:<br>AnchorLatitude = 5536988<br>AnchorLongtitude = 836620<br>Radius = 40 | ID = 812<br>AddrType = SSID<br>Addr = OperatorSSID812<br>IP = <skipped><br>AuthInfo:<br>AuthType = HTTP-DIGEST<br>AuthName = Username<br>AuthSecret = Secret<br>BearerType = WLAN<br>BearerParam:<br>SecMode = 802.1X |
| 3 (WLAN) | 3GPP Location:<br>UTRAN_CI = 3048<br>UTRAN_CI = 4053 | ID = 1056<br>AddrType = SSID<br>Addr = OperatorSSID1056<br>IP = <skipped><br>AuthInfo:<br>AuthType = HTTP-DIGEST<br>AuthName = Username<br>AuthSecret = Secret<br>BearerType = WLAN<br>BearerParam:<br>SecMode = 802.1X |

Table 1 consists of two access network discovery entries. The leftmost column states type of access network, in this case exemplified by WLAN. The middle column states an area of the access network, e.g. in terms of latitude, longitude, and radius. The rightmost column states information about the access network, e.g. authorization information and bearer types used therein etc. The first rule (first row), for example, states that there is a WLAN access network (with SSID "OperatorSSID812") available in the area described by the geographical coordinates. The second rule (second row) states that there is a WLAN access network available in two 3GPP cells, indicated by their respective cell IDs (3048 and 4053, respectively).

TABLE 2

ANDSF MO - ISRP

| Rule Priority | ForFlowBased | Roaming | PLMN | UpdatePolicy |
|---|---|---|---|---|
| 1 | IPFlow:<br>StartSourcePortNumber = 22<br>EndSourcePortNumber = 23 (SSH, Telnet)<br>StartDestPortNumber = 22<br>EndDestPortNumber = 23<br>ValidityArea:<br>AnchorLatitude = 5536988<br>AnchorLongtitude = 836620<br>Radius = 40<br>RoutingRules:<br>AccessTechnology = 1 (3GPP) | 0 (UE not roaming) | 24009 | 0 (UE not required to update the policy) |
| 2 | IPFlow:<br>ProtocolType = 6 (TCP)<br>ValidityArea:<br>AnchorLatitude = 5536988<br>AnchorLongtitude = 836620<br>Radius = 40<br>TimeOfDay:<br>TimeStart = 170000<br>TimeStop = 180000<br>RoutingRules:<br>AccessTechnology = 3 (WLAN)<br>AccessId = OperatorSSID812 | 0 (UE not roaming) | 24009 | 0 (UE not required to update the policy) |

Table 2 contains ISRP, and in particular description of two rules that apply to the same location (in this case represented by geographical coordinates). It is noted that the rules overlap, since the first one characterizes all data-flows carried via ports 20 to 23, all of which usually carry Transmission Control Protocol (TCP) traffic. At the same time, the second rule applies to all TCP traffic, and is hence more generic. In order to make sure that the Telnet traffic and Secure Shell (SSH) traffic (ports 22 and 23 respectively) is carried over 3GPP RA, the first rule is given a higher priority (the lower number means, in this example, higher priority). The rule priority is indicated in the leftmost column of Table 2.

Consideration of RAN Signaled Parameters in ANDSF Policies 3GPP is currently discussing whether or not to introduce a parameter signaled from the 3GPP RAN to be used in an ANDSF policy. One example of such parameter is called "Offloading Preference Indicator (OPI)". This parameter can be signaled to Wi-Fi capable terminals or User Equipments (UEs) either using broadcast signaling (e.g. as part of a system information block) or be sent to the UEs in a dedicated message, e.g. an Radio Resource Control (RRC) message transmitted over a Signaling Radio Bearer.

It has not been decided yet how the parameter should be used or what form the parameter should take. In one approach, the parameter takes the form of a string of bits, for example of size 4. Correspondingly, the ANDSF policy refers to one or more of these bits and based on the value of these bits, the appropriately configured terminal applies an associated behavior, as described by the ANDSF policy. One example could be that the terminal should attempt to connect to WLAN if bit number 3 is set to 1, but if the bit is set to 0 then the terminal should not attempt to connect to WLAN.

As different terminals may have received different ANDSF policies, it is possible that one terminal (or one set of terminals) considers one bit in the bitstring, while another terminal (or another set of terminals) considers another bit in the bitstring. This approach means that sending the same bitstring to different terminals can initiate different behaviors, because the different terminals or groups of terminals consider and respond to different bits in the same bitstring.

One problem with defining the OPI as a bit-string is that different operators may want to use the OPI in different ways and thereby retain the freedom to define their own policies for dictating UE behavior as a result of the OPI. Among other things, this situation makes it problematic to use the OPI for roaming UEs that receive ANDSF policies from their home operator.

In order to get a consistent behavior for roaming UEs which receive ANDSF policies from their home operator, it would be required to either standardize the meaning of different OPI values, e.g. in a manner similar to how the QoS Class Identifier (QCI) values has been standardized in 3GPP TS 23.203 for roaming, or accept that OPI values will differ between different operators. For example, if operator X wants consistent roaming behavior for its UEs in operator Y's network, operator X must obtain additional information about the usage of OPI within the network of operator Y. Such information can be provided as part of Service Layer Agreements (SLAs) between operators.

Neither of these two approaches is optimal.

If OPI meanings are standardized, network operators lose the flexibility to use the OPI in their own ways. Further, there is a problem of operators wanting to use the OPI but not wanting to expose any detailed information about their networks as a consequence of such use, e.g., implicitly exposing load or congestion levels. In case the OPI values are standardized, the risk of exposure of network information increases compared to the case where the meaning of the OPI is defined by the operators themselves and kept internal.

In case the OPI is not standardized, each given operator must exchange information with other operators to tell the other operators how the OPI should be used. This also leads to risks of exposure of internal network information to other parties. It further implies a potentially costly and burdensome administrative task, because of the potentially large number of operator combinations (operator relationships) in the world.

This disclosure introduces the concept of splitting the OPI into different regions where different regions are used by different categories of UEs. The regions can be overlapping and it is possible that one region is completely included in another region.

For example, assume that the OPI is 4 bits. Then a first region A can include all values of all of the 4 bits (bit 1-4), while a second region B includes only bit 1. It is noted that the first bit in a bitstring is sometimes referred to as bit 0, and sometimes as bit 1. For the sake of readability the first bit will herein be referred to as being bit 1.

Region A is used, for example, by UEs in their home network or UEs belonging to an operator for which the home operator has a special agreement with the network owner, and Region B is used by roaming UEs.

In the above example embodiment, it is possible for the home operator to use all 4 bits of the OPI for its own users, while allowing roaming users to use bit 1 of the OPI. In this case the value of bit 1 can be standardized at only a limited cost in terms of loss of flexibility and increased network exposure.

The embodiment relies on that either the network or the UE behaves differently in case of roaming users compared to non-roaming users, thus making it possible for these different user categories to use different regions of the OPI.

Examples how an Operator can Use the OPI while Limiting Exposure of Network Information In a scenario where the RAN provides to the terminal a bitmap that is used in an ANDSF policy and where the bits indicate whether or not to offload to WLAN, the bitmap(s) may disclose the load of the RAN. As is known in the art, a bitmap (also denoted bit array or bitstring) is an array data structure that compactly stores bits. The bitmap is a mapping from some domain to values in the set {0,1}, for instance a mapping from "do not offload to Wi-Fi/offload to Wi-Fi" to {0,1}.

For example (assuming that a 1 in the bitmap indicates that the terminal should attempt to offload some or all of its traffic to WLAN, and 0 in the bitmap indicates that the terminal should not attempt to offload traffic to WLAN), if the RAN is setting many of the bits to 1 it may mean that the network is suggesting that many terminals (or groups of terminals) should attempt to offload to WLAN which in turn implies that the RAN is loaded. Similarly, if many bits are set to 0, the network is suggesting that many terminals (or groups of terminals) should not attempt to offload to WLAN and that implies that the RAN is not loaded.

Some operators may not want to expose such indications of network load and hence the above approach would not be suitable. An operator could avoid exposing load for example by scrambling the bitstring such that a 1 in the bitstring does not always indicate that a terminal (or set of terminals) should offload to the WLAN, and 0 does not always indicate that the terminal(s) should not offload to the WLAN. For example, if the bitstring is of size 4, the following interpretation may be used:

Bit 1: Terminals in group A should offload to WLAN if the value is 0, and if the value is 1 the terminals in group A should not offload to WLAN.

Bit 2: Terminals in group B should offload to WLAN if the value is 1, and if the value is 0 the terminals in group A should not offload to WLAN.

Bit 3: Terminals in group C should offload to WLAN if the value is 1, and if the value is 0 the terminals in group A should not offload to WLAN.

Bit 4: Terminals in group D should offload to WLAN if the value is 0, and if the value is 1 the terminals in group A should not offload to WLAN.

As noted earlier, the first bit in a bitstring may be referred to as bit 0; however for the sake of readability, this disclosure refers to the first bit as being bit 1. The terminals may be grouped e.g. according to different subscription classes, e.g. classes gold, silver, bronze, where e.g. terminals belonging to subscription class bronze should be offloaded to WiFi so that the other subscription classes obtains improved service in a cellular network. In another example, the terminals may be grouped based on type of devices, e.g. machine type devices such as sensors, or smartphone. For instance, offloading may then be performed based on amount of data (typically) sent by a certain type of device. As still another example on grouping of terminals their mobility patterns may be used. A terminal moving slowly may comprise a first group, and terminals moving fast may comprise a second group, and e.g. offloading the first group to WiFi rather than the second group. Various other groupings exist, e.g. based on type of ongoing service etc.

The network 1 (e.g. ANDSF server 2 thereof) could indicate to the terminals of each group how they should interpret the bits. For example, the network 1 indicates to group A terminal that if bit 1 takes value 0 the UEs of group A should offload to WLAN, and if bit 1 takes value 1 the terminals of group A should not offload to WLAN. For example, the network 1 could provide an ANDSF policy for terminals in group A as follows:

Prio 1: WLAN if bit1=0
Prio 2: 3GPP

While for a terminal of group B, bit 2 should be considered and the following ANDSF policy could be provided:

Prio 1: WLAN if bit2=1
Prio 2: 3GPP
And so on.

Another mechanism for hiding the network load is contemplated herein and is based on leaving the use of this bitstring operator specific, meaning that it is up to the operator to decide how to use the bitstring. The operator may then use some, or all, bits in the bitstring for some other purpose, e.g., to indicate which types of traffic should be offloaded. One possibility is that bit 1 is used to indicate which WLAN the terminal should prioritize when doing offloading, e.g., if bit 1 is set to 1 the terminal should prioritize a WLAN A, while if bit 1 is set to 0 the terminal should prioritize a WLAN B. Which WLAN to prioritize would likely not be dependent on the load and hence if one or more bits in the bitstring is used for the purpose of indicating priorities between WLANs, the load of the network can be hidden. Other methods for hiding the network load are also possible, such as transmitting dummy (random) values of the OPI which are not related to internal network parameters.

Exemplary Embodiments for Roaming Users

One problem with applying a method where the network load is hidden arises in case of roaming terminal operating within the network. These roaming terminals may not be aware of how to interpret the bitstring, since the network has not configured them to interpret the bitstring in the correct way, i.e., the network has not provided ANDSF policies suitable for the bitstring provided by the RAN. There is a risk of faulty and/or unwanted terminal behavior in such cases, e.g., arising from a terminal incorrectly interpreting the bitstring. Alternatively, the terminals would need to ignore the bitstring.

To avoid this problem it would be possible to reserve a part of the bitstring, In various embodiments hence, a part of the bitstring is reserved for roaming terminals and this part of the bitstring would be made publicly known, for example by specifying the meaning of this part of the bitstring in a specification. An operator could then configure ANDSF policies using this part of the bitstring that would result in a predictive behavior of the terminals when roaming in another operator's network. In the remainder of this document this part of the bitstring will be referred to as the public part, while the hidden part of the bitstring will be referred to as the operator specific part.

The network could then for the operator-specific part apply some method for hiding the load, while in the public part of the bitstring provide load explicitly. However it should be noted that it would be up to the operator to decide whether or not to actually signal the load in the public part. That is, a given operator may not be concerned with making the load publically available and could then set the public part according to the load of the network. But it would at the same time allow another operator to not set the public part according to the network load. Instead, such an operator may set the public part to always indicate low load (or no load) of the network. Alternatively by making the public part of the OPI smaller than the operator specific part, it is possible to keep the detailed network information hidden while exposing only some limited information in the public part, which might be acceptable to an operator that is concerned about disclosing internal operating parameters of the network.

When discussing roaming, and as mentioned earlier, sometimes the terms "visited network" and "home network" are used. The home network is the network of the operator with which a terminal has a subscription from, while the visited network is the network of the operator that provides the RAN in which the terminal is roaming.

The teachings herein do not exclude the case where a roaming terminal applies the operator-specific part of the visited network bitstring. For example, it may be that the operator of the home network and the operator of the visited network have entered an agreement allowing the roaming terminal to apply the operator-specific part of the bitstring and therefore the visited network provides to the roaming terminal a means to decode the operator-specific part of the bitstring in the visited network. This can be achieved by the visited network providing an ANDSF policy to the roaming terminal that allows the terminal to interpret the operator-specific part of the bitstring in the correct way.

Exemplary Ways of Bitmap Division

In various embodiments, the bitstring (bitmap) may be divided in different ways. In one exemplary bitmap division, the public part of the bitstring is the N least significant bits of the bitstring and the operator-specific part of the bitstring is the rest of the bits. For example, if the bitmap is four bits then the least (or most) significant bit can be used for roaming users and the three most (or least) significant bits are used for non-roaming users.

For example, if the bitstring is 4 bits then bit 1 may be the public bit (public part) while bit 2, bit 3 and bit 4 belong to the operator-specific part. Of course, the opposite logic may be used, wherein the operator-specific part is the least-significant bit(s) while the public part is the most-significant bit(s).

Other ways to split the bitstring may be contemplated. For example, the network may assign ranges of binary values to the different regions or parts. As a non-limiting example of such assignments, the public part of the bistring use values from 0000 to 0010, while the operator-specific part use values from 0011 to 1111.

Which bits are belonging to the public part and the operator-specific part of the bitstring can be specified in a specification, for example be specified in a 3GPP specification such as the RRC specification of LTE (TS 36.331) or UMTS (TS 25.331).

It may also be possible that the network indicates to the terminal which bits belong to the public part and which bits belong to the operator specific part. This could for example be achieved by the network indicating a value X where the value X indicates how many bits of the bitstring belongs to the public part and then bit 1 to bit X would belong to the public part. In various embodiments, it may also be so that the most significant bits are being the public part and the value X would then indicate that bit (N−X+1) to bit N belong to the public part (where N is the total number of bits of the bitstring). There are different solutions for how the network may indicate the value X to the UE, e.g. via RAN signaling or via ANDSF policies.

Similarly, the network may indicate which bits belong to the operator specific part.

In various embodiments, it may also be so that the UE does not know the different parts or regions of the OPI, but the network makes sure that UEs which are roaming only receives (ANDSF) policies associated with the public part of the OPI.

Example of UE Behavior

The UE or terminal receives ANDSF policies where different rules are associated with different values of the OPI.

Optionally the UE receives different ANDSF policies for use in roaming and non-roaming scenarios, or ANDSF policies with different validity conditions, e.g. policies that are only valid in a certain Public Land Mobile Network (PLMN).

The UE receives an OPI value from the RAN, e.g. via broadcast or dedicated signaling.

Optionally the UE also receives information about which part of the OPI is used for roaming and which parts are used when not roaming The UE checks if it is roaming or not, e.g. by checking the current PLMN ID of the network and comparing this to a stored PLMN ID of the home network or operator.

When the UE is not roaming:
  The UE applies the part of OPI used when not roaming when checking if any ANDSF rules should be applied. Alternatively the UE applies the ANDSF policy for non-roaming scenarios or with the appropriate validity condition.

When the UE is roaming:
  The UE applies the part of OPI used when roaming when checking if any ANDSF rules should be applied. Alternatively the UE applies the ANDSF policy for roaming scenarios or with the appropriate validity condition.

Figure 6:
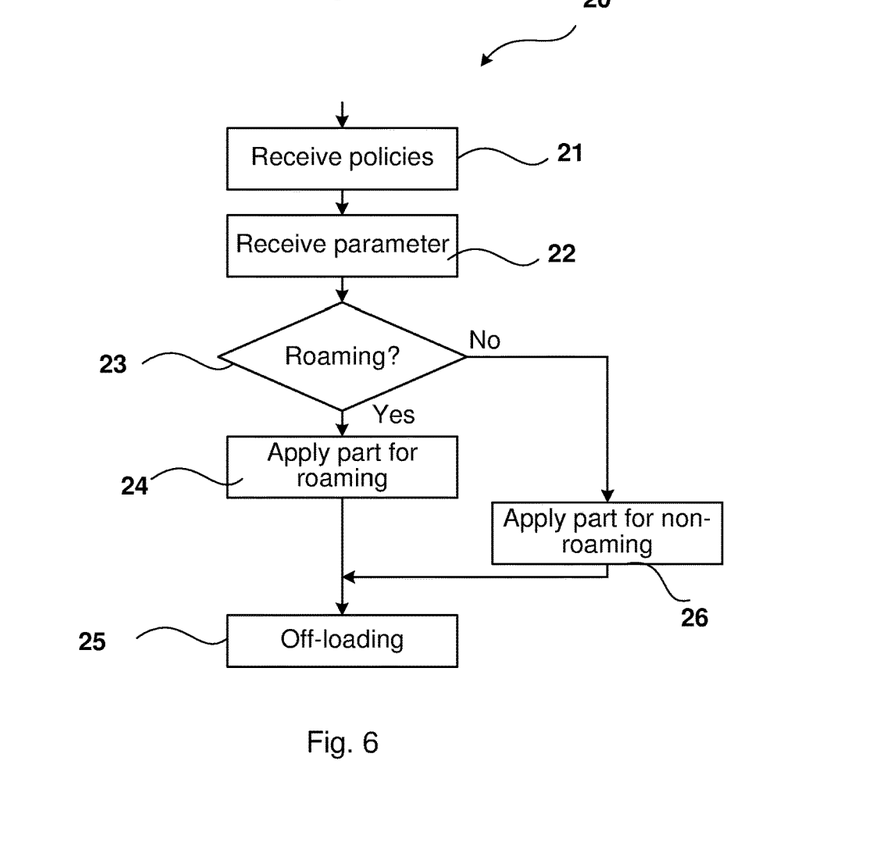
FIG. 6 is a flowchart of an embodiment of a method in a communication device/user node.

Embodiments are related to a method in a communication device, such as a UE, for receiving one or more signaled parameter(s) as exemplified by FIG. 6. It should be noted that the method steps outlined below are optional and may be performed also in any order other besides the illustrated order.

According to some embodiments, the method in the communication device includes the steps of:

receiving policies, such as ANDSF policies, where different rules are associated with different values of the signaled parameter, such as the offloading preference indicator (OPI). Thus, receiving instructions/information on which part(s)/bit(s) of the signaled parameter to use depending on whether the communication device is roaming (in a roaming state) or not (non-roaming);

receiving a reference value, such as an OPI value, from a radio network node. According to some embodiments, the reference value is received via broadcast. According to some other embodiments, the reference value is received via dedicated signaling;

checking whether the communication device is roaming or not;

when in a non-roaming state, applying the part of OPI used when not roaming when checking if any ANDSF rules should be applied;

when roaming, applying the part of OPI used when roaming when checking if any ANDSF rules should be applied;

off-loading to a different radio access network, such as WLAN, than the radio access network, such as LTE, it currently uses/is accessed to With reference still to FIG. 6, an embodiment of a method 20 is provided that may be performed in a UE 3. The UE 3 receives, box 21, policies from an ANDSF server 2.

In box 22, the UE 3 receives an OPI bitstring from a radio network node of the network in which it is currently located, i.e. in the network in which is being served, which may be the home network or a visited network. The network node sending the OPI bitstring may e.g. be an eNB in case the network is an LTE network or an AP in case the network is a Wi-Fi network.

In box 23, the UE 3 determines whether or not it is in a roaming state. This may for instance be done by the earlier indicated comparison of the current PLMN ID of the network and a stored PLMN ID of the home network or operator. If this comparison reveals that the UE 3 is roaming, then flow continues to box 24.

In box 24, if the UE 3 is aware of which parts (regions) of the OPI bitstring that is intended for roaming users, then the UE 3 applies this part of the received OPI bitstring, and e.g. based on this knowledge apply a certain ANDSF policy that it has received from the ANDSF server 2. The UE 3 may be aware of which part of the OPI bitstring to use when roaming for instance by being configured to always look at a specific bit (e.g. bit 1) of the OPI bitstring when roaming. If the UE 3 is not aware of the particular OPI bitstring partitioning into different parts of the visited network, it may receive instructions from a network node (e.g. ANDSF server) of the visited network regarding which parts of the OPI parameter to use. Once the UE 3 knows which part of the OPI parameter to use, it may apply the corresponding policy.

If, in box 23, the comparison reveals that the UE 3 is not roaming, i.e. that it is in its home network, then flow continues to box 25. In box 25, the UE applies the ANDSF policies corresponding to the non-roaming part of the OPI bitstring, which part could be the operator specific part.

As mentioned, the various embodiments and features that have been described may be combined in different ways, further examples of which are provided next, still with reference to FIG. 6.

A method 20 is provided, for access control or access selection. The method 20 may be performed in a communication device 3, e.g. a smartphone or other device as described earlier. The method 20 may be used e.g. for access control or access selection. Such access control or access selection may comprise e.g.: initial access selection, prior to being connected to a second access (or any access); traffic steering wherein the communication device 3 is connected to multiple accesses and moves some or all data carrying bearers from one access type to another; traffic aggregation, wherein the communication device 3 is connected to multiple access types and use these accesses for data transmission/reception at the same time, possibly for the same data flow.

The method 20 comprises obtaining 21 a policy comprising one or more rules associated with different values of a parameter, the parameter comprising a first part and a second part. The parameter may be seen as split in two parts, which enables the use of the two parts in different ways, a particular example of which is that a first part of the parameter is used by roaming users, while a second part of the parameter is used by non-roaming users. The obtaining 21 the policy may comprise obtaining an ANDSF policy from an ANDSF server 2, e.g. via S14 interface (as described earlier e.g. with reference to FIG. 5).

The method 20 comprises receiving 22 the parameter, in particular OPI parameter. The parameter may be received in broadcast signaling or dedicated signaling from e.g. an eNB of a RAN.

The method 20 comprises applying 24, 26 a rule associated with a value of the first part of the parameter or a rule associated with a value of the second part of the parameter. The applying may for instance comprise applying 24 a part of the parameter used for roaming devices. The communication device 2 may establish that it is roaming in a visited network e.g. by obtaining a current PLMN ID and compare it to a PLMN ID of its home network, which PLMN ID may be stored in a memory of the communication device 3. The applying may correspondingly comprise applying 26 another part of the parameter, which part is used for non-roaming devices.

A certain communication device 3 may thus obtain a policy stating e.g. that if a received parameter matches "1000", then it should use a WLAN, while if the parameter matches "0100", then the WLAN should be used only if received WLAN signal is stronger than −60 dB.

In an embodiment, the method 20 comprises, before the applying 24, 26, establishing 23 whether being part of a first group of communication devices or a second group of communication devices. As a particular example, the first group may comprise communication devices that are roaming and the second group may comprise communication devices that are not roaming.

In a variation of the above embodiment, the establishing 23 whether being part of a first group of communication devices or a second group of communication devices comprises establishing whether being in a non-roaming or roaming state. As mentioned, the communication device 3 may establish whether it is roaming or not.

In an embodiment, the rule comprises directing some or all communication traffic to a radio access network 5 different from a currently serving radio access network 4 or directing some or all traffic between two currently serving radio access networks 4, 5. The communication device 3 may be connected to different RANs simultaneously, and for instance have existing communication traffic in a WLAN while also having existing communication traffic in a 3GPP network (e.g. a 4G network). As a particular example, the communication device may have a first service ongoing in the WLAN and a second and a third service in the 3GPP network. The policy that it receives may then state that the second service of the 3GPP network should be steered to the WLAN. The policies may thus for instance state that all traffic should be moved from and/or to a particular access type, or that a particular access type should be selected for particular services or which access type should currently be used for new communication traffic.

In various embodiments, the method 20 comprises obtaining information about which of the first and second parts of the parameter to use when being part of a first group and when being part of a second group. The obtaining may comprise receiving the information from e.g. an eNB or the information may be preconfigured in the communication device 3, and the obtaining may thus comprise retrieving the information from a memory.

In various embodiments, the parameter comprises an Offloading Preference Indicator, OPI.

In various embodiments, the first part of the parameter comprises an operator specific part and the second part of the parameter comprises a public part. It is noted that in some embodiments the network may indicate to the communication device 3 which part of the parameter is the private part and/or which is the public part, while in other embodiments this is not done. An operator of a network may indicate only to operators of other networks their particular parameter mapping of the public part/private part, without informing the communication devices thereof.

In various embodiments, the first part comprises N least significant bits of the parameter or N most significant bits of the parameter, and wherein the second part comprises the remaining bits of the parameter.

In various embodiments, the obtaining 21 comprises receiving the policy from a network node 2 or obtaining a policy preconfigured in the communication device 3.

In various embodiments, the parameter is received from a serving network node 4, 5.

Example of Network Behavior (e.g. ANDSF Server)

The network node (e.g. ANDSF server 2) sends policies to the UE 3 related to different values of the OPI.

Depending on if the UE 3 is roaming or not the network node sends policies that are only associated with the part of the OPI that is used for roaming UEs, e.g. the public part, or it sends policies associated with the part of the OPI used for non-roaming UEs, e.g. the operator specific part.

Optionally, the network sends instructions to the UE containing information about which parts of the OPI shall be used, or shall be used when roaming or when not roaming.

Figure 7:
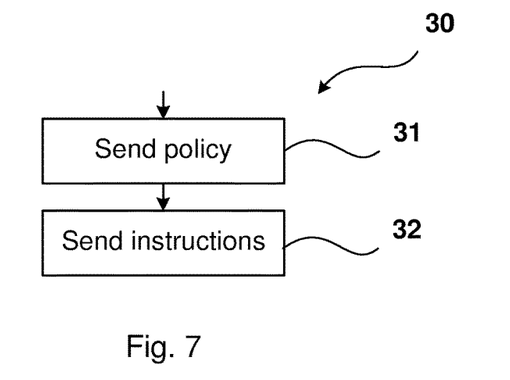
FIG. 7 is a flowchart of an embodiment of a method in a radio network node.

Embodiments are related to a method in a radio network node, such as an ANDSF server, for signaling one or more parameter, such as an offloading preference indicator to at least one communication device, such as a user equipment as exemplified by FIG. 7. It should be noted that the method steps outlined below are optional and may be performed in any order other than the illustrated.

According to some embodiments, the method in the radio network node includes the steps of:
  sending policies, such as ANDSF policies, to one or more communication device related to different values of the signaled one or more parameter;
  sending instructions to the communication device regarding which part(s)/bit(s) of the signaled parameter to use depending on whether the communication device is roaming (in a roaming state) or not (non-roaming).

The present disclosure also provides a method 30 that may be performed in a communication network 1, such as described with reference to FIG. 5. The method 30 may comprise sending 31, from a first network node, policies to UEs 3. The first network node may for instance comprise an ANDSF server 2, and the policies may hence comprise ANDSF policies.

The method 30 comprises sending 32 instructions from the first network node 2 or from a second network node to the UE 2. The instructions may comprise information on which part of an OPI parameter to use when being in and the second network node may for instance be an eNB 4 of an LTE network or an AP 5 of a WiFi network.

It is noted that the sending 31 of the policies from the first network node 2 may be effectuated via the second network node 4, 5 of the communication system 1.

As Mentioned, the Various Embodiments and Features that have been Described May be Combined in Different Ways, Further Examples of which are Provided Next, Still with Reference to FIG. 7.

A method 30 is provided, which may be performed in a communication system 1. The method 30 may be performed in a single node, e.g. an ANDSF server 2, or the method 30 may be performed and implemented in a distributed manner, wherein some steps are performed in a first network node and other steps are performed in a second network node. The method 30 comprises sending 31, to at least one communication device 3, a policy comprising one or more rules associated with different values of a parameter, the parameter comprising a first part and a second part. The policy may be sent from an ANDSF server 2 to a communication device 3 via a radio access network, e.g. an eNB thereof.

In various embodiments, and in a manner corresponding to what has been described earlier, e.g. in relation to FIG. 6, the first part and the second part are to be used by different categories of communication devices.

In a variation of the above embodiment, the method 30 comprises sending 32 information about which of the first and second parts of the parameter to use when being part of a first category of communication devices and when being part of a second category of communication devices.

In an embodiment, the sending 32 comprises sending the information in dedicated signaling in a radio access network 4, 5 or by broadcasting the information in the radio access network 4, 5.

In various embodiments, a first category of communication devices comprises communication devices in a non-roaming state and a second category of communication devices comprises communication devices in a roaming state.

In various embodiments, the parameter comprises an Offloading Preference Indicator, OPI.

In an embodiment, the method 30 is performed in a network node 2 of the communication system 1, the network node 2 comprising an Access Network Discovery and Selection Function, ANDSF. The network node 2 may comprise an ANDSF server.

Figure 8:
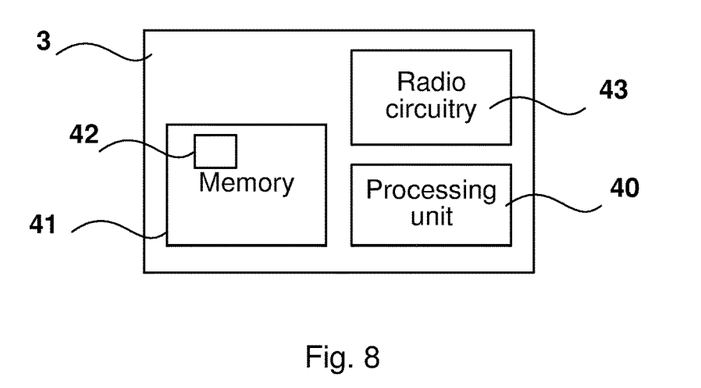
FIG. 8 illustrates an exemplary communication device/user node for embodiments of the present teachings.

FIG. 8 illustrates one embodiment of a communication device, such as a UE, which also may be referred to as an apparatus. The apparatus comprises radio circuitry that is configured to communicate with radio network nodes and a processing unit that is operatively associated with the radio circuitry, e.g., to send data and control signaling to a communication network via the radio circuitry, and to receive data and control signaling from the communication network via the radio circuitry.

The processing unit in one or more example embodiments includes or is associated with memory, such as FLASH or EEPROM or some other computer-readable medium that provides non-transitory storage. In at least one embodiment, the computer-readable medium stores a computer program product comprising program instructions that, when executed by the processing unit, configures the apparatus according to the device-side teachings herein.

By way of non-limiting example, the processing unit, which is also referred to herein as a "processing circuit" or simply as a "processor," shall be understood as comprising computer circuitry, such as one or more microprocessor-based circuits, DSP-based circuits, FPGA-based circuits, ASIC-based circuits, or other digital processing circuitry. Broadly, such circuitry comprises fixed processing circuitry or programmed processing circuitry, or a mix of both fixed and programmed processing circuitry.

The radio circuit is configured to send and receive signals, including data and control signaling, such as ANDSF policy signaling. In one or more embodiments, the radio circuit includes a radio transmitter and a radio receiver that are operative as an RF transceiver, e.g., a cellular radio modem that is configured to operate in one or more communication frequency bands and in accordance with one or more defined communication network standards, e.g., one or more 3GPP standards.

The processing circuit is configured to receive policies, such as ANDSF policies, where different rules are associated with different values of the signaled parameter, such as the offloading preference indicator (OPI). Thus, the processing circuit receives instructions/information on which part(s)/bit(s) of the signaled parameter to use depending on whether the apparatus is roaming (in a roaming state) or not roaming (in a non-roaming state). The processing circuit, again via signaling received through the radio circuitry, is further configured to receive a reference value, such as an OPI value, from a radio network node. According to some embodiments, the reference value is received via broadcast. According to some other embodiments, the reference value is received via dedicated signaling.

Correspondingly, the processing circuit is configured to check whether the communication device is roaming or not. When in a non-roaming state, the processing circuit in one or more embodiments is configured to check whether any ANDSF rules should be applied, based on processing/interpreting the portion of the OPI that applies to the not-roaming state. Conversely, when in a roaming state, the processing circuit is configured to check whether any ANDSF rules should be applied, based on processing/interpreting the portion of the OPI that applies to the roaming state or condition. The processing circuit evaluates the applicable portion of the OPI and correspondingly whether to off-load traffic/load to a different radio access network, such as WLAN, from the radio access network, such as LTE, it is currently using/connected to.

Thus, in at least one embodiment, a communication device is configured for operation in a wireless communication network, such as a cellular network, and comprises:
  radio circuitry that is configured to receive first information from the network; and
  a processing circuit operatively associated with the radio circuitry and configured to:
  determine whether or not the device is in a roaming state or in a non-roaming state;
  process and respond to a first part of the first information, for the case where the device is in the non-roaming state; and
  process and respond to a second part of the first information, for the case where the device is in the roaming state.

The first information comprises, for example, an OPI bitstring having a private (first) part that is applicable for the non-roaming case and a public (second) part that is applicable for the roaming case. Thus, for the non-roaming case, the processing circuit is configured to evaluate whether or not to offload from the wireless communication network to an alternate network, such as WiFi, based on processing the private part of the received bitstring. Conversely, for the roaming case, the processing circuit is configured to evaluate whether or not to offload to an alternate network, based on processing the public part of the received bitstring. In at least one embodiment, the device receives a bitmap or other instructional information from the network that enables the device to properly process the received bitstring or other OPI information. In other embodiments, the device may be preconfigured with such information, such as where standardized or predefined OPI definitions are used.

The aforementioned memory or other computer-readable medium is configured in at least some embodiments to store computer program code and/or configuration information, e.g., policy or rules information.

As mentioned, the various embodiments and features that have been described may be combined in different ways, further examples of which are provided next, still with reference to FIG. 8.

A communication device 3 is provided. The communication device 3 configured to:
  obtain a policy comprising one or more rules associated with different values of a parameter, the parameter comprising a first part and a second part,
  receive the parameter, and
  apply, a rule associated with a value of the first part of the parameter or a rule associated with a value of the second part of the parameter.

The communication device 3 may be configured to execute any of the embodiments of the method 20 e.g. by comprising one or more processors 40 (denoted processing unit in the FIG. 8) and one or more memories 41, the memory 41 containing instructions executable by the processor 40, whereby the memory 41 is operative to perform the steps of the method 20.

In an embodiment, the communication device 3 is configured to establish whether being part of a first group of communication devices or a second group of communication devices, before applying the rule. The communication device 3 may thus apply, in response to the establishing 23, a certain rule associated with a value of the first or second part of the parameter.

In an embodiment, the communication device 3 is configured to establish whether being part of a first group of communication devices or a second group of communication devices by establishing whether being in a non-roaming state or a roaming state.

In various embodiments, the rule comprises directing some or all communication traffic to a radio access network 5 different from a currently serving radio access network 4 or directing some or all traffic between two currently serving radio access networks 4, 5.

In an embodiment, the communication device 3 is configured to obtain information about which of the first and second parts of the parameter to use when being part of a first group and when being part of a second group.

In various embodiments, the parameter comprises an Offloading Preference Indicator, OPI.

In various embodiments, the first part of the parameter comprises an operator specific part and the second part of the parameter comprises a public part.

In various embodiments, the first part comprises N least significant bits of the parameter or N most significant bits of the parameter, and wherein the second part comprises the remaining bits of the parameter.

In various embodiments, the communication device 3 is configured to obtain by receiving the policy from a network node 2 or by obtaining a policy preconfigured in the communication device 3.

In various embodiments, the communication device 3 is configured to receive the parameter from a serving network node 4, 5.

The present disclosure also encompasses computer program product 41 comprising a computer program 42 for a communication device 3 and a computer readable means on which the computer program 52 is stored. The computer program 42 comprises computer program code, which, when executed on at least one processor in the communication device 3 causes the communication device 3 to perform the method 20 according to any of the described embodiments thereof.

The computer program product 42, or the memory, thus comprise instructions executable by a processor 40. Such instructions may be comprised in a computer program, or in one or more software modules or function modules.

Means are provided, e.g. function modules, that can be implemented using software instructions such as computer program executing in a processor and/or using hardware, such as application specific integrated circuits, field programmable gate arrays, discrete logical components etc., or any combination thereof.

In particular, a communication device is provided. The communication device comprises first means for obtaining a policy comprising one or more rules associated with different values of a parameter, the parameter comprising a first part and a second part. Such means may for instance comprise circuitry for receiving the policy over an interface. The communication device comprises second means for receiving the parameter. Such means may for instance comprise receiving circuitry and/or antenna devices etc. for receiving wireless signaling. The communication device comprises third means for applying a rule associated with a value of the first part of the parameter or a rule associated with a value of the second part of the parameter. Such means may for instance comprise processing circuitry adapted to apply the rule associated with a value of a certain part of the parameter.

Figure 9:
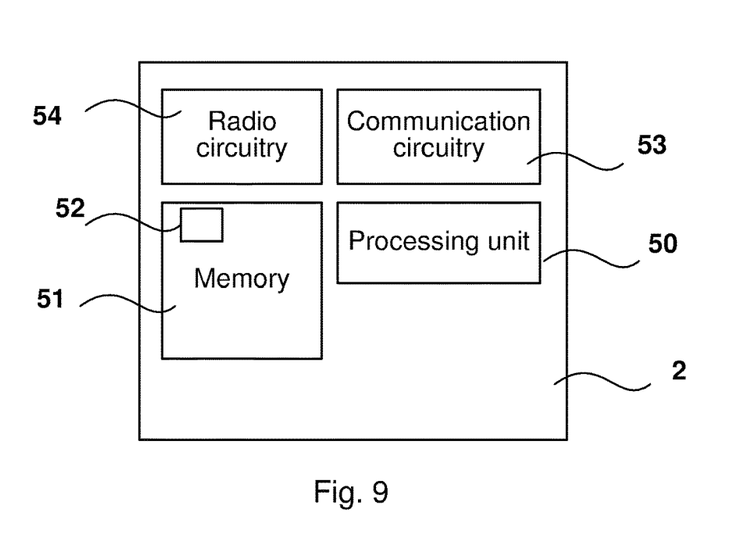
FIG. 9 illustrates a radio network node for embodiments of the present teachings.

On the network-side, FIG. 9 illustrates a network node, such as an ANDSF server, which is configured for operation in a communication network. The network node, also referred to as an apparatus, includes one or more communication interfaces, e.g., for communicating directly or indirectly with communication devices operating in one or more cells in the communication network, and/or for communicating with other nodes in the network. In one or more embodiments, the communication interface(s) comprise or otherwise include radio circuitry to communicate with served communication devices, communication circuitry to communicate with other radio network and core network nodes, a processing unit operatively associated with the communication interface(s), and memory or other computer-readable medium to store configuration information and/or computer program instructions supporting implementation of the network-side processing taught herein.

The communication interface(s) are configured in one or more embodiments to receive and send to/from a core network node, such as the MME, information and signaling related to embodiments described herein.

The processing unit is configured to send and receive data and other information, via signaling to and from the communication interface(s).

The processing unit in one or more example embodiments includes or is associated with aforementioned memory, which comprises FLASH or EEPROM or some other computer-readable medium that provides non-transitory storage. In at least one embodiment, the computer-readable medium stores a computer program product comprising program instructions that, when executed by the processing unit, configures the network node according to the network-side teachings herein.

By way of non-limiting example, the processing unit, which is also referred to herein as a "processing circuit" or simply as a "processor," shall be understood as comprising computer circuitry, such as one or more microprocessor-based circuits, DSP-based circuits, FPGA-based circuits, ASIC-based circuits, or other digital processing circuitry. Broadly, such circuitry comprises fixed processing circuitry or programmed processing circuitry, or a mix of both fixed and programmed processing circuitry.

In at least one embodiment, the processing circuit of the example network node is configured to signal first information, such as one or more parameters comprising an offloading preference indicator, OPI, to at least one communication device, such as a user equipment. The processing circuit is further configured to send additional information, such as instructions, to the communication device on a downlink channel. The additional information enables the communication device to properly interpret the first information, e.g., it comprises instructions or indications as to which part(s)/bit(s) of the first information to use, in dependence on whether the communication device is roaming (in a roaming state) or not (non-roaming).

The memory stores, for example, configuration information comprising the bitmap definitions or other rules comprising the additional information needed by the communication device for properly interpreting the first information, e.g., the OPI bitstring.

Thus, in an example embodiment, a network node is configured for operation in a communication network and comprises:
 a communication interface configured for communicating directly or indirectly with a communication device operating in the communication network; and
 a processing circuit that is operatively associated with the communication interface and configured to:
 generate first information having a first part applicable to operation of the communication device in a non-roaming state, and a second part applicable to operation of the communication device in a roaming state; and
 transmit the first information to the communication device, via the communication interface.

The first information comprises, for example, OPI information, such as a bitmap that has a private part—the first part pertaining to non-roaming operation—and a public part—the second part pertaining to roaming operation. The processing circuit is configured in one embodiment to generate the first and/or second parts, based on loading information determined by or provided to the network node. In one or more other embodiments, the network node is configured to receive the first and/or second parts, or at least the values for setting the first and/or second parts from another node in the network.

Further, in at least one embodiment, the processing circuit of the network node is configured to send additional information, e.g., instructions or other configuration information, to the communication device, that indicates to the communication device how to properly interpret the first information. For example, the instructions comprise a bitmap or other bit definitions that identify which bit(s) in a bitstring comprise the public part and the private part, and which may identify the proper interpretation of such bits and/or disclose any scrambling applied thereto.

As mentioned, the various embodiments and features that have been described may be combined in different ways, further examples of which are provided next, still with reference to FIG. 9.

A communication system 1 is provided. The communication system 1 is configured to send, to at least one communication device 3, a policy comprising one or more rules associated with different values of a parameter, the parameter comprising a first part and a second part.

The communication system 1 may be configured to perform the above steps e.g. by comprising one or more processors 50 and one or more memories 51, the memories 51, each containing instructions executable by the processors 50, whereby the memory 51 is operative to perform the steps. As noted earlier, the method 30 may be performed in a single network node or in a distributed fashion in different network nodes, hence a single network node may be configured to perform the method 30, e.g. the ANDSF server 2.

In various embodiments, the first part and the second part are to be used by different categories of communication devices.

In a variation of the above embodiment, the first part and the second part are to be used by different categories of communication devices.

In a variation of the above embodiment, the communication system 1 is configured to send information about which of the first and second parts of the parameter to use when being part of a first category of communication devices and when being part of a second category of communication devices.

In various embodiments, the communication system 1 is configured to sending by sending the information in dedicated signaling in a radio access network 4, 5 or by broadcasting the information in the radio access network 4, 5.

In various embodiments, a first category of communication devices comprises communication devices in a non-roaming state and a second category of communication devices comprises communication devices in a roaming state.

In various embodiments, the parameter comprises an Offloading Preference Indicator, OPI.

The present disclosure also encompasses computer program product 51 comprising a computer program 52 for a communication system 1 and a computer readable means on which the computer program 52 is stored. The computer program 52 comprises computer program code, which, when executed on at least one processor in the communication system 1 causes the communication system 1 to perform the method 30 according to any of the described embodiments thereof. The computer program 52 may be executed in a single network node 2 or in several nodes.

The computer program product 52 or the memories, thus comprise instructions executable by a processor 50. Such instructions may be comprised in a computer program, or in one or more software modules or function modules.

Means are provided, e.g. function modules, that can be implemented using software instructions such as computer program executing in a processor and/or using hardware, such as application specific integrated circuits, field programmable gate arrays, discrete logical components etc., or any combination thereof.

In particular, a communication system is provided. The communication system comprises first means for sending, to at least one communication device 3, a policy comprising one or more rules associated with different values of a parameter, the parameter comprising a first part and a second part. Such means may for instance comprise processing transmission circuitry and/or antenna devices.

The invention claimed is:

1. A method performed in a communication device, the method comprising:
    obtaining a policy comprising one or more access network discovery and selection function, ANDSF, rules associated with different values of an offloading preference indicator, OPI, the OPI comprising a first part and a second part, wherein the obtaining comprises receiving the policy from a network node (2) or obtaining a policy preconfigured in the communication device;
    receiving the OPI;
    establishing whether being in a non-roaming or a roaming state;
    applying an ANDSF rule associated with a value of the first part of the OPI or an ANDSF rule associated with a value of the second part of the OPI depending on whether the communication device is in a non-roaming or roaming state, and
    wherein the first part of the OPI comprises an operator specific part and the second part of the OPI comprises a public part.

2. The method as claimed in claim 1, wherein the ANDSF rule comprises directing some or all communication traffic to a radio access network different from a currently serving radio access network or directing some or all traffic between two currently serving radio access networks.

3. The method as claimed in claim 1, wherein the first part comprises N least significant bits of the OPI or N most significant bits of the OPI, and wherein the second part comprises the remaining bits of the OPI.

4. The method as claimed in claim 1, wherein the OPI is received from a serving network node.

5. A non-transitory computer readable storage medium storing a computer program for a communication device, the computer program comprising computer program code that, when executed on at least one processor on the communication device, causes the communication device to:
    obtain a policy comprising one or more access network discovery and selection function, ANDSF, rules associated with different values of an offloading preference indicator, OPI, the OPI comprising a first part and a second part, wherein the obtaining comprises receiving the policy from a network node (2) or obtaining a policy preconfigured in the communication device;
    receive the OPI;
    establish whether being in a non-roaming or a roaming state;
    apply an ANDSF rule associated with a value of the first part of the OPI or an ANDSF rule associated with a value of the second part of the OPI depending on whether the communication device is in a non-roaming or roaming state, and
    wherein the first part of the OPI comprises an operator specific part and the second part of the OPI comprises a public part.

6. A communication device, comprising:
    radio circuitry; and
    processing circuitry operatively associated with the radio circuitry and configured to:
    obtain a policy comprising one or more access network discovery and selection function, ANDSF, rules associated with different values of an offloading preference indicator, OPI, the OPI comprising a first part and a second part, wherein the obtaining comprises receiving the policy from a network node (2) or obtaining a policy preconfigured in the communication device;
    receive the OPI;
    establish whether being in a non-roaming or a roaming state;
    apply an ANDSF rule associated with a value of the first part of the OPI or an ANDSF rule associated with a value of the second part of the OPI depending on whether the communication device is in a non-roaming or roaming state, and wherein the first part of the OPI comprises an operator specific part and the second part of the OPI comprises a public part.

7. The communication device as claimed in claim 6, wherein the rule comprises directing some or all communication traffic to a radio access network different from a currently serving radio access network or directing some or all traffic between two currently serving radio access networks.

8. The communication device as claimed in claim 6, wherein the first part of the OPI comprises N least significant bits of the OPI or N most significant bits of the OPI, and wherein the second part comprises the remaining bits of the OPI.

9. The communication device as claimed in claim 6, wherein the processing circuitry is configured to receive the OPI from a serving network node.

* * * * *